2

3,795,647
Patented Mar. 5, 1974

3,795,647
AGGLOMERATING LATICES OF DIENE POLYMERS
Basil Alexander Ripley-Duggan, Old Harlow, England, assignor to Doverstrand Ltd.
No Drawing. Filed Mar. 7, 1972, Ser. No. 232,550
Int. Cl. C08d 7/18; C08j 1/00
U.S. Cl. 260—29.7 SQ                 5 Claims

ABSTRACT OF THE DISCLOSURE

Latices of conjugated aliphatic diene polymers containing hydrophilic functional groups are agglomerated by subjecting them to high velocity shear in the presence of small amounts of the ammonium or alkali metal salts of N-(higher alkyl) sulphosuccinamates.

---

This invention relates to a process for preparing agglomerated diene polymer latices and to agglomerated polymer latices prepared by the process.

The term "agglomerated polymer latices" is used in this specification to mean latices in which at least a proportion of the primary particles which are formed during emulsion polymerization are irreversibly aggregated into larger particles each of which is composed of two or more of such primary particles. For an agglomeration process to be useful, it is not essential that all the primary particles should be thus agglomerated. Improved latices are obtained when only a proportion of the primary particles are agglomerated, although generally it is advantageous that this proportion should be substantial. The distribution of particle sizes of the agglomerated latex can be both random and broad.

One effect of agglomerating primary particles is to reduce the specific surface area of the dispersed polymer, a fact which permits the agglomerated latices to be concentrated to higher solids contents, in comparison with the corresponding unagglomerated latices comprising only the smaller primary particles, before the viscosity of the concentrated latex becomes excessive. In many industrial applications of synthetic polymer latices, a high solids content combined with good fluidity is a highly desirable property. For example, high solids content latices are desirable for foamed latex compositions which are spread on textiles. Latices which exhibit excessive viscosities are difficult to process both during manufacture and during subsequent utilization.

While it is possible so to regulate an emulsion polymerization reaction that the specific surface area of the particles of the final latex is relatively large, thus permitting the latex to be concentrated conveniently to a high solids content, for various reasons there are many advantages attached to the agglomeration of relatively small primary particles in a separate and subsequent stage to the polymerization. For example, emulsion polymerization of butadiene alone or with other monomers demands expensive and complicated equipment. In general, small particle size latices can be produced by relatively short polymerization cycles, resulting in higher yields from expensive capital facilities, compared with larger particle latices. If such small particle latices can subsequently be agglomerated to form latices which are susceptible to concentration to a much higher solids content, overall advantages in economy and convenience of manufacture result.

Basic to any agglomeration procedure is the need to secure operating conditions which are conveniently wide between the absence of agglomeration on the one hand and the formation of coagulum or floc on the other hand. Coagulum and floc are the manifestation of excessive agglomeration, i.e. the combination of a proportion of primary particles into excessively large aggregates. Such coagulum or floc interferes with subsequent processing and utilization of the agglomerated latex; it must be removed by time-consuming processes and represents a loss both of raw materials and of production economy.

Many processes have been proposed for agglomerating diene polymer latices after the polymerization stage, by methods which can be classified broadly as either chemical or physical with respect to the operating factors for agglomeration. The chemical methods essentially involve an interference with the colloidal stability of the latex by means of added chemicals, such as by high molecular weight colloids or by swelling agents for the dispersed polymer, sometimes combined with water-miscible organic substances which are solvents for the emulsion stabilizer. The physical methods involve essentially destabilization by purely mechanical methods such as by freezing or by shearing the latex. The borderline between physical and chemical factors is not always sharply distinguishable.

In the case of diene polymer latices, it is very remarkable that almost invariably the agglomeration methods previously proposed are applicable to latices stabilized essentially with carboxylic acid soaps, typically soaps derived from oleic or rosin acids. That is, the primary latices are prepared by emulsion polymerization in the presence of such soaps as the principal emulsifying agent for the monomers, these soaps also serving to stabilize the polymer latex. The pH of the aqueous phase must, of necessity, be maintained at relatively high values during polymerization, preferably over pH 10, since these soaps are more or less insoluble at lower pH values. Obviously the reason is that the carboxylic acids which are used to form the soaps are weak acids, and as the pH value of the latex is reduced their degree of ionization is reduced. Likewise, the stability of the latex is reduced as the pH value is reduced.

In many applications of diene polymer latices (e.g. in the case of foamed compositions which are spread on textiles) it is highly desirable that the dispersed polymer should contain minor proportions of functional groups derived from certain hydrophilic functional monomers. These functional monomers are of course copolymerized during the emulsion polymerization stage which leads to the primary particles. Many such desirable functional monomers cannot be copolymerized when carboxylic acid soaps are employed as the emulsifier at high pH values. The most striking example is that of unsaturated carboxylic acid monomers (e.g. acrylic and itaconic acids). For the same basic reason that a carboxylic acid soap requires a high pH value to be effective, i.e. promotion of the ionization of the acid, the carboxylic acid monomer copolymerizes only with extreme difficulty at high pH values. The carboxylic acid monomer is also strongly ionized at high pH values, and the monomeric radical ion is resonance-stabilized and relatively inert towards copolymerization. Under such conditions, the overall conversion rate to polymer is sharply reduced and the resulting polymer is found to contain little or no hydrophilic functional comonomer.

Certain neutral hydrophilic functional monomers such as hydroxyalkylates or methacrylates are also difficult to copolymerize at high pH values. In this case, gross coagulum is frequently encountered.

These and other functional hydrophilic monomers are best copolymerized with dienes at much lower pH values e.g. in the case of carboxylic acid monomers in a pH range of 1 to 5; in the case of hydroxyalkylacrylates and methacrylates; acrylamide, methacrylamide and their N-hydroxyalkyl derivatives, around neutral pH. Carboxylic acid soaps are not formed at these pH values in useful proportions, and, although emulsions of polymers containing copolymerized hydrophilic groups are intrinsically more stable than emulsions of polymers without such groups, it is usually necessary to employ other emulsifiers. Non-ionic and cationic emulsifiers can be used, but synthetic anionic emulsifiers containing sulphonic, sulphuric or phosphoric acid residues are most suitable. Such emulsifiers are ionized over a broad pH range down to low pH values, and accordingly maintain their emulsifying and stabilizing properties over a broad pH range, unlike emulsifiers derived from carboxylic acids.

The desirability of the presence of such hydrophilic functional groups in the polymer contained in the agglomerated latex springs from a number of reasons, examples of which are: (1) greater stability of the latex towards chemical and mechanical agents which cause destabilization; (2) the susceptibility to cross-linking or curing of the polymer by chemicals other than sulfur and sulfur-vulcanizing accelerators, which may be used in addition to sulfur-vulcanizing agents, e.g. reactive melamine-formaldehyde resins; (3) greater adhesion of the polymer to fibrous substrates and better binding properties for mineral fillers which may be added to latex compositions; and (4) in the case of foamed latex compositions, a finer structure and better surface appearance of the foamed composition after drying and curing.

We have now discovered that diene polymer latices can be readily and controllably agglomerated by shear at a pH below 7 when the shearing is effected in the presence of certain N-alkyl sulphosuccinamates.

The present invention therefore broadly provides a process for agglomerating a diene polymer latex, wherein the latex is subjected to high velocity shearing at a pH below 7 in the presence of an N-alkyl sulphosuccinamate of the formula

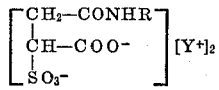

wherein R is an alkyl radical containing 12 to 20 carbon atoms and each Y is an alklali metal atom or an ammonium or substituted ammonium radical.

The present process is particularly applicable to the aforesaid diene polymer latices containing copolymerized hydrophilic groups, which latter latices cannot be conveniently agglomerated by previously proposed physical processes. Since the present latices are agglomerated in an acid pH range they are preferably not stabilized with carboxylic acid soaps but with synthetic anionic emulsifiers which contain at least one sulphonic, sulphuric or phosphoric acid residue. Indeed, as mentioned above, such emulsifiers are preferably used in the emulsion polymerization of the butadiene and hydrophilic group-containing monomer.

The shearing of the latex is preferably effected in the manner of homogenization, i.e. the latex is subjected to extremely high velocity shear by passing the latex under pressure through a small, restricted oriffce whereby the latex is subjected to instantaneous acceleration to velocities as high as 900 ft./sec., extreme turbulence combined with cavitation and preferably impingment. In normal practice this may be done in a commercially available homogenizer such as a Manton-Gaulin homogenizer. Such homogenizers are practically speaking high-pressure, positive displacement plunger pumps which force the latex through a small, restricted orifice, the area of which may be changed. This is usually accomplished by varying the compression of a valve against the mating members of the orifice. Operating pressures of up to 8,000 p.s.i. are standard. Although it has already been proposed to agglomerate certain polymer latices by subjecting the latices to shear in this manner, the pH of the latex had to be above 7, and, in particular, many diene polymer latices containing copolymerized hydrophilic groups could not readily and reproducibly be agglomerated in this manner. It is therefore surprising that the presence of the aforesaid N-alkyl sulphosuccinamates enables such latices to be controllably agglomerated at a pH below 7.

The diene polymers which may be agglomerated in accordance with the invention are bipolymers, terpolymers and multipolymers of conjugated aliphatic dienes including $C_{4-6}$ conjugated aliphatic diene such as butadiene, isoprene and halogenated derivatives thereof such as chloroprene.

More particularly, the polymers which may be used in the invention are copolymers of such $C_{4-6}$ conjugated aliphatic dienes with an hydrophilic functional comonomer and at least one other secondary monomer which is copolymerizable therewith. These diene polymers are preferably comprised of 50–80% by weight diene, 0.5–5% by weight hydrophilic functional monomer(s) with the remainder of the polymer consisting of secondary monomers.

Preferred secondary monomers are styrene and other vinyl aromatic monomers such as divinyl benzene, acrylic nitriles such as acrylonitrile and methacrylonitrile and vinylidene chloride.

The polymer latices which may be agglomerated by the present process and the resulting agglomerated diene polymer latices are preferably polymers having a composition within the following ranges and most preferred ranges, in which all quantities are expressed as parts by weight per 100 parts by weight of total polymer:

|  |  | Most preferred range |
|---|---|---|
| Butadiene | 50–80 | 50–80 |
| Vinylidene chloride | 15–49.5 | 15–49 |
| Styrene | 15–49.5 | 15–49 |
| Acrylonitrile | 15–49.5 | 15–49 |
| Hydrophilic functional monomer(s) | 0.5–5 | 1–5 |

The hydrophilic functional monomer is selected from one of the following groups, but more than one such monomer may be used, in which case they are selected from one or more than one of the following groups:

(a) Copolymerizable ethylenically unsaturated carboxylic acids; for example, acrylic acid, methacrylic acid, itaconic acid, fumaric acid and maleic acid; alkyl monoesters of such ethylenically unsaturated dicarboxylic acids such as monomethyl itaconate and monomethyl maleate; 1,2,3-butene tricarboxylic acid; and cinnamic acid.

(b) Copolymerizable ethylenically unsaturated hydroxyalkyl esters of acrylic acid and methacrylic acid and the formals thereof; for example beta-hydroxyethylacrylate,
beta-hydroxypropylacrylate,
beta-hydroxyethyl-methacrylate,
beta-hydroxypropyl-methacrylate,
O-hydroxymethyl-beta-hydroxyethylacrylate,
O-hydroxymethyl-beta-hydroxypropylacrylate,
O-hydroxymethyl-beta-hydroxyethylmethacrylate, and
O-hydroxymethyl-beta-hydroxypropylmethacrylate.

(c) Copolymerizable unsaturated acid amides and their N-hydroxy-alkyl derivatives, for example acrylamide, methacrylamide, N-methylolacrylamide, N-methylolmethacrylamide, O - butyl-N-methylolacrylamide and O-butyl-N-methylolmethacrylamide.

As indicated above, the latices used in the present process are prepared by emulsion polymerization using standard polymerization techniques. In a preferred method of preparing a latex containing hydrophilic groups, a mixture of monomers is emulsified in water in a closed agitated pressure resisting reaction vessel equipped with an agitator and a jacket for cooling or heating, the atmosphere above the reaction mixture being free of oxygen. The proportion of water may be varied quite widely, for example from 80 to 400 parts by weight per 100 parts by weight of all monomers, preferably about 150 parts by weight. The emulsifier may be any synthetic anionic emulsifier containing sulphonic, sulphuric or phosphoric acid residues, for example, a disodium-N-alkyl sulphosuccinamate, sodium dodecylbenzene sulphonate, sodium dodecanol sulphate, a sodium or ammonium "Dobanol" or "Alphol" polyoxyethylated ether sulphate ("Dobanol" and "Alphol" being trademarks for synthetic alcohols containing 12 or more carbon atoms), a sodium-dialkyl sulphosuccinate in which the alkyl groups contain from 4 to 13 carbon atoms, a sodium sulphated or sulphonated oleic or ricinoleic acid or an ester thereof, a sodium dodecyl-diphenyl oxide disulphonate, a sodium alkyl naphthalene sulphonate, a sodium-methylene-bis (naphthalene sulphonate), or a sodium alkyl or arylphosphate or a polyoxyethylated derivative thereof.

Two or more synthetic anionic emulsifiers each containing a sulphonic, sulphuric or phosphoric acid residue may be used in combination. The proportion of such emulsifier or emulsifiers should preferably be from 0.2 to 8 parts by weight per 100 parts by weight of total monomers, preferably in the range 1 to 4 parts by weight.

The polymerization is initiated by a free-radical initiator such as the peroxydisulphuric acid ion, an organic peroxide or hydroperoxide or azo-bis-isobutyronitrile. Reducing agents may be added to maintain polymerization at the desired temperature, which may be between 0 and 80° C. depending upon the free radical initiation system used. Heating or cooling is also applied to maintain the desired polymerization temperature.

Other ingredients well known in emulsion polymerization may also be present such as electrolytes, sequestering agents for metal ions, molecular weight modifiers, acids or bases. The pH value of the polymerization may be varied widely but preferably lies within the range 1 to 7, depending upon the nature of the monomers present, particularly the hydrophilic monomers.

Agitation and heating or cooling are continued until the desired conversion to polymer is attained, which is preferably between 60 and 100 percent. If necessary, the polymerization is then stopped by injection of a free-radical inhibitor or of a large quantity of reducing agent.

Before agglomeration by the present process, the latex may be stripped of unreacted monomers but this is not essential. Furthermore, if desired, the latex may be concentrated or diluted.

The solids content by weight of the resulting primary latex should lie in the range of 20 to 55%, but for production efficiency and convenience a range of 35 to 45% is preferred. It is preferred that the latex should be vacuum stripped of residual monomers and organic volatile substances before agglomeration, especially if the latex is to be concentrated by evaporation after agglomeration, since foaming difficulties will thereby be minimized. However, it is not essential that the primary latex should be stripped before shearing.

When the salt of a N-(higher alkyl) sulphosuccinamate is added, the addition should preferably be made before adjustment of the pH of the latex to a value below 7.0. The N-(alkyl) sulphosuccinamate is added in the form of an aqueous solution in a minor amount such that the total proportion of this compound in the latex is preferably from 0.5 to 7 parts by weight of compound per 100 parts by weight latex solids. The total proportion necessary depends upon various factors such as the nature and proportion of other emulsifiers present, the pH value, the nature and proportion of hydrophilic functional monomer, the solids content of the latex, the pressure in the agglomeration equipment and the temperature of the latex. These facors are preferably to be balanced in order to secure the right degree of agglomeration combined with avoidance of the formation of floc and coagulum during shearing.

If some N-(higher alkyl) sulphosuccinamate is present during the emulsion polymerization stage, alone or in combination with other synthetic anionic emulsifiers, then it may be possible to proceed the agglomeration stage without further addition of emulsifier, provided that the proportion of N-(higher alkyl) sulphosuccinamate falls within the range specified above. On the other hand, further additions of N-(higher alkyl) sulphosuccinamate alone or in combination with other synthetic anionic emulsifiers may be made if necessary in order sufficiently to stabilize the latex.

The stabilized primary latex is then passed through the orifice of the homogenizer under pressure. Particularly suitable equipment is a homogenizer, such as the Manton-Gaulin homogenizer. The pressure in the homogenizer is adjusted to obtain suitable conditions for agglomeration while avoiding the formation of floc and coagulum.

The agglomerated latex may then be concentrated to higher solids contents. If necessary, emulsifiers, electrolytes and acids or bases may be added to aid stability and fluidity during and after concentration. An indication of satisfactory agglomeration is the attainment of a solids content of at least about 62% accompanied by a viscosity of under about 1000 cp. Such latices are extremely desirable for many industrial applications of synthetic polymer latices.

The invention will now be illustrated by the following examples.

EXAMPLE I

Emulsion polymerizations were carried out in stirred pressure reaction vessels using the following polymerization recipes, in which all quantities are expressed in parts by weight:

TABLE I

| Reference | A | B |
|---|---|---|
| Butadiene | 62.5 | 62 |
| Styrene | 20 | 20 |
| Acrylonitrile | 15 | 15 |
| Hydroxyethyl acrylate | 2.5 | 3 |
| t-Dodecyl mercaptan | 0.8 | 0.8 |
| Sodium ethylenediamine tetraacetate | 0.05 | 0.03 |
| "Perlankrol" EAD 60 [1] | 1 | |
| Potassium oleate | | 3.5 |
| Ammonium persulphate | 0.2 | 0.15 |
| Water | 200 | 150 |
| Temperature, degree C | 55 | 60 |
| Final pH | 5.4 | 10 |
| Coagulum | Nil | Extensive |

[1] Ammonium polyoxyethylated synthetic alcohol sulphate (trade name of Lankro Chemical Company).

This example illustrates the readier copolymerization of a hydrophilic functional monomer (hydroxyethyl acrylate) using a synthetic anionic emulsifier containing sulphate groups compared with the situation when potassium oleate is used at elevated pH.

EXAMPLE II

Latex A in Example I above was concentrated to about 41% solids content by evaporation, after the addition of 1 part by weight "Perlankrol" EAD 60 for stabilization, and samples of the latex were then subjected to shearing in the A.P.V. Manton-Gaulin laboratory homogenizer type 15M–8BA, manufactured by the A.P.V. Company, Crawley, Sussex, England. Disodium-N-octadecyl sulphosuccinamate was added to two of the samples before the shearing was effected. After further concentration, the following data was obtained.

TABLE II

| Total amount of "Perlankrol" EAD 60 present | Total [1] | Shearing pressure, p.s.i. | Solids content, percent | Viscosity, cp. |
|---|---|---|---|---|
| 2 parts | | | 41.7 | 284 |
| 3.2–3.4 parts | | 2,500 | Much coagulum | |
| 3.25 parts | | 2,000 | [2] 51.6 | 1,570 |
| 2 parts | 1 | 2,000 | Much coagulum | |
| 2 parts | 1.5 | 2,000 | 56.9 | 750 |

[1] Amount of disodium-N-octadecyl sulphosuccinamate present.
[2] 0.4 parts tetrasodium pyrophosphate added after shearing.

In the above and in succeeding examples, all the additions to the latex are expressed in parts by weight of latex solids. The additions of "Perlankrol" EAD 60 and of the sulphosuccinamate were made as 10% solutions;

tetrasodium pyrophosphate was added dry with good agitation.

This example shows that when "Perlankrol" EAD 60 alone was present it was very difficult to obtain conditions conducive to such a degree of agglomeration that the latex could be concentrated to a high solids content while retaining a low viscosity. On the other hand, the addition of disodium-N-octadecyl sulphosuccinamate before shearing clearly led to a broadening of the conditions between coagulum formation and over-stablization, so that a favorable solids content/viscosity relationship was attainable while avoiding the formation of coagulum during shearing.

EXAMPLE III

The polymerization exemplified in A, Example I, was repeated satisfactorily using 150 parts water. One part of disodium-N-octadecyl sulphosuccinamate was added to the latex which was then sheared at a pressure of 3000 p.s.i. After the addition of 0.8 part tetrasodium pyrophosphate, the agglomerated latex was concentrated to a solids content of 65.5% without coagulum formation; the concentrated latex exhibited a viscosity of only 760 cp.

EXAMPLE IV

A butadiene/styrene/acrylonitrile/acrylic acid 62.5/20/15/2.5 polymer was prepared using 150 parts of water and 2 parts of "Perlankrol" EAD 60 in the polymerization. After the addition of 2 parts of disodium-N-octadecyl sulphosuccinamate, this latex having a pH of 6.0 was sheared at a pressure of 3000 p.s.i. The agglomerated latex was concentrated to a solids content of 59.4%; the concentrated latex exhibited a viscosity of 1142 cp.

EXAMPLE V

A butadiene/styrene/acrylonitrile/hydroxyethyl acrylate 62.5/20/15/2.5 polymer was prepared using 150 parts of water and 2 parts of disodium-N-octadecyl sulphosuccinamate in the polymerization. After the addition of a further 0.75 part of the sulphosuccinamate, the latex having a pH of 6.0 was sheared at a pressure of 3000 p.s.i. The agglomerated latex could be concentrated to a solids content of 61.3%; the concentrated latex exhibited a viscosity of only 190 cp.

TABLE III
[All quantities are in parts by weight]

| Reference | A | B | C | D |
|---|---|---|---|---|
| Butadiene | 62.5 | 62.5 | 52.5 | 62.5 |
| Styrene | 36.5 | 36 | 35.5 | 35 |
| Acrylic acid | 1 | 1.5 | 2 | 2.5 |
| t-Dodecylmercaptan | 0.5 | 0.5 | 0.5 | 0.5 |
| Sodium lauryl sulfate | 2 | 2 | 2 | 2 |
| Sodium salt of polymerized alkynaphthalene sulfonic acids | 0.5 | 0.5 | 0.5 | 0.5 |
| Temperature, degrees C | 30 | 30 | 30 | 30 |

After degassing, the solids content of each latex was approximately 40% by weight. Each was subjected to agglomeration by shearing in a Manton-Gaulin homogenizer by each of the following procedures:

(1) After addition of a 10% disodium-N-octadecyl sulphosuccinamate solution, the proportion of disodium-N-octadecyl sulphosuccinamate was adjusted until a satisfactory degree of aglgomeration was achieved without coagulum formation. After addition of the disodium-N-octadecyl sulphosuccinamate, the pH of the latex was in the range 5–6 approximately.

(2) After addition of the same proportion of disodium-N-octadecyl sulphosuccinamate as in procedure (1) above, ammonia was added until the pH of the latex was about 7.

(3) After addition of ammonia only to a pH in the range 6.5–8.

The shearing pressure was 5000 pounds/inch$^2$. The extent of agglomeration was assessed by examining the latex under a projection microscope.

The latices described as extensively agglomerated were susceptible to concentration to at least 60% solids content before the viscosity became excessive; those described as slightly agglomerated were susceptible to concentration to not more than about 54%, before the viscosity became excessive.

The proportion of coagulum formed by shearing was also measured by filtering the latex on a 100 mesh screen.

TABLE IV

The amount of disodium-N-octadecyl sulphosuccinamate shown is in parts by weight of active substance/100 parts by weight latex solids.

| Reference | A | B | C | D |
|---|---|---|---|---|
| Procedure (1): | | | | |
| Amount disodium-N-octadecyl sulphosuccinamate | 1.3 | 1.5 | 1.8 | 1.55 |
| pH | 5.8 | 5.6 | 5.1 | 4.9 |
| Extent of agglomeration | Extensive | Extensive | Moderate | Extensive |
| Coagulum | Slight | Slight | Nil | Nil |
| Procedure (2): | | | | |
| Amount disodium-N-octadecyl sulphosuccinamate | 1.3 | 1.5 | 1.8 | 1.55 |
| pH | 7 | 6.9 | 6.1 | 7 |
| Extent of agglomeration | Nil | Nil | Slight | Slight |
| Coagulum | Nil | Nil | Nil | Nil |
| Procedure (3); No disodium-N-octadecyl sulphosuccinamate: | | | | |
| pH | 7.3 | 6.9 | 6.8 | 6.5 |
| Extent of agglomeration | | | | |
| Coagulum | Complete | Complete | Complete | Complete |
| pH | 7.5 | 7.0 | 6.9 | 6.8 |
| Extent of agglomeration | Slight | Extensive | Medium | Slight |
| Coagulum | Nil | Some | Slight | Nil |
| pH | 7.7 | 7.1 | 7.0 | |
| Extent of agglomeration | Slight | Slight | Slight | |
| Coagulum | Nil | Nil | Nil | |

EXAMPLE VI

The following table describes the polymer composition and aqueous emulsification system of latices prepared in a stirred pressure vessel having a capacity of ½ cubic meter. Approximately 200 kg. of monomers were charged. The temperature of polymerization is stated in the table. The initiator system was derived from diisopropylbenzene hydroperoxide/sodium formaldehyde sulfoxylate/ferrous sulfate-ethylenediamine tetraacetc acid complex. After polymerization to substantially complete conversion the latices were degassed by application of a vacuum to the reaction vessel.

These experiments demonstrate: (a) that at pH values below 7, the presence of disodium-N-octadecyl sulphosuccinamate stabilizers the latex in such a way that if the pH of the latex is sufficiently low, preferably 6 or below, it can be efficiently agglomerated without the accompaniment of coagulum formation and (b) that in the absence of disodium-N-octadecyl sulphosuccinamate, the latex tends to be either unstable, forming excessive coagulum on shearing, or too stable to be agglomerated. There is a very narrow pH range in which some agglomeration without coagulum formation occurs, but it is too narrow to be of practical utility.

EXAMPLE VII

A polymer latex was prepared by polymerizing the following emulsions at a temperature of 10 degrees C. in a closed reaction vessel (all quantities are in parts by weight: butadiene 62.5; styrene 35.5; acrylic acid 2; t-dodecyl mercaptan 0.5; sodium lauryl sulfate 2; Daxad 15 0.5 (trademark of Grace Chemical Co.); ethylenediamine tetraacetic acid 0.05; sodium sulfate 0.5; diisopropylbenzene hydroperoxide 0.1; sodium formaldehyde sulfoxylate 0.1; ferrous sulfate-ethylenediamine tetraacetic acid complex 0.015; and water 150. The final conversion was 98%.

After degassing, the latex exhibited the following properties:

Solids content _____ 40% w./w.
pH _____ 3.5.
Particle size _____ 0.07 micron (by light scattering).
Surface tension _____ 66 dynes/cm.
Viscosity _____ 70 cp. (Brookfield LVF, spindle 3, 30 r.p.m.).

The latex was subjected to the following procedures:

(a) Increasing proportions of sodium N-octadecyl sulphosuccinamate were added and the treated latices subjected to one pass through a Manton-Gaulin homogenizer, until no coagulum was formed as a result of shearing.

(b) Increasing proportions of sodium lauryl sulfate were added, and the latex processed according to (a) above.

The following information was gained:

| Procedure | (a) | (b) |
|---|---|---|
| Satbilizer added | Sodium N-octadecyl sulphosuccinamate. | Sodium lauryl sulfate. |
| Minimum proportion required to prevent coagulum formation, parts by weight active substances/100 parts by weight latex solids. | 2.05–2.15 | 1.82–1.88. |
| Extent of agglomeration.[1] | Extensive | Slight. |
| Concentrated solids content, percent. | 58 | Not susceptible to concentration over 50% by weight solids content. |
| Viscosity, cp. (Brookfield LVF, Spindle 3, 60 r.p.m.). | 3,070 | |

[1] Assessed by observation in a projection microscope.

This example shows that the addition of sodium N-octadecyl sulphosuccinamate before passage through a homogenizer permitted a satisfactory degree of agglomeration to be attained, so that a concentrated latex of a highly desirable polymer containing about 2 parts by weight of copolymerized acrylic acid could be prepared. On the other hand when another emulsifier was used for stabilization, the same extent of agglomeration was not attained and the latex could not be concentrated to a satisfactorily high solids content.

What is claimed is:

1. A process for agglomerating latices of conjugated aliphatic diene copolymers derived from the copolymerization of 50–80% wt. conjugated aliphatic diene, 0.5–5% wt. hydrophilic functional monomer and 15–49.5% wt. of a secondary monomer selected from the group consisting of vinyl aromatic, acrylic nitrile and vinylidene chloride monomers comprising subjecting such latices to high velocity shear through a constriction at a pressure of at least about 2,000 p.s.i. in the presence of from about 0.5 to about 7 parts by weight, basis 100 parts by weight dry polymer solids, of an N-$C_{12-20}$-alkyl sulphosuccinamate selected from the group consisting of ammonium and alkali metal salts thereof.

2. The process of claim 1 in which the pH of the latices is below 7.

3. The process of claim 1 in which the conjugated aliphatic diene polymer is a multipolymer of from about 50 to about 80% by weight butadiene, from about 0.5 to about 5% by weight of a hydrophilic functional monomer and at least one other secondary monomer.

4. The process of claim 3 in which the secondary monomer is selected from the group consisting of vinylidene chloride, styrene and acrylonitrile.

5. The process of claim 3 in which the hydrophilic functional monomer is selected from the group consisting of copolymerizable ethylenically unsaturated carboxylic acids, hydroxyalkyl esters of monocarboxylic acids, formals of hydroxyalkyl esters of monocarboxylic acids, acid amides, N-hydroxyalkyl acid amides and the lower alkyl half esters of dicarboxylic acids.

References Cited

UNITED STATES PATENTS

| | | | |
|---|---|---|---|
| 2,368,067 | 1/1945 | Lynch | 260—513 N |
| 3,318,831 | 5/1967 | Gauslaa | 260—29.7 PT |
| 3,678,021 | 7/1972 | Chatelain et al. | 260—92.8 W |
| 2,252,401 | 8/1941 | Jaeger | 260—239.3 |

OTHER REFERENCES

American Cyanamid publication, Aerosol® Surface Active Agents (1963), pp. 6, 7, 40, 41, 42, 44.

ALLAN LIEBERMAN, Primary Examiner

T. DeBENEDICTIS, Sr., Assistant Examiner

U.S. Cl. X.R.

260—29.7 W; 29.7 T, 29.7 H, 34.2, 513 N